United States Patent
Dazzi et al.

(10) Patent No.: US 8,260,833 B2
(45) Date of Patent: Sep. 4, 2012

(54) NAMING SCHEME FOR MEDIA STORAGE

(75) Inventors: Alain Dazzi, San Jose, CA (US); Arun Krishnan, Cupertino, CA (US)

(73) Assignee: Clarendon Foundation, Inc., Murray, UT (US)

( * ) Notice: Subject to any disclaimer, the term of this patent is extended or adjusted under 35 U.S.C. 154(b) by 49 days.

(21) Appl. No.: 13/015,076

(22) Filed: Jan. 27, 2011

(65) Prior Publication Data

US 2011/0191397 A1    Aug. 4, 2011

Related U.S. Application Data

(60) Provisional application No. 61/299,498, filed on Jan. 29, 2010.

(51) Int. Cl.
G06F 12/00    (2006.01)
G06F 17/30    (2006.01)

(52) U.S. Cl. .................................. 707/827; 707/822

(58) Field of Classification Search ................ 707/827
See application file for complete search history.

(56) References Cited

U.S. PATENT DOCUMENTS

| | | |
|---|---|---|
| 6,385,693 B1 | 5/2002 | Gerszberg et al. |
| 6,490,705 B1 | 12/2002 | Boyce |
| 6,651,103 B1 | 11/2003 | Markowitz et al. |
| 6,708,213 B1 | 3/2004 | Bommaiah et al. |
| 6,757,796 B1 | 6/2004 | Hofmann |
| 6,792,449 B2 | 9/2004 | Colville et al. |
| 6,801,964 B1 | 10/2004 | Mahdavi |
| 6,978,306 B2 | 12/2005 | Miller et al. |

*Primary Examiner* — Apu Mofiz
*Assistant Examiner* — Mohammad Rahman
(74) *Attorney, Agent, or Firm* — Steven L. Nichols; VanCott, Bagley, Cornwall & McCarthy P.C.

(57) ABSTRACT

A method allowing for fast mapping between a content identifier (ID) for a media content file and the file path of said media content file includes: dividing a plurality of characters making up the contend ID into a plurality of ordered subsections separated by a separator character, correlating at least one of the subsections with a directory in an electronic file system, and correlating the last of the subsections with a name of the media content file, the media content file being located within a directory correlated with a preceding subsection.

15 Claims, 6 Drawing Sheets

Fig. 1

Lookup Table (200)

| Content ID (202) | Media Content File Path (204) |
|---|---|
| AB | /www/mstore1/dir2/file4.jtv |
| CD | /www/mstore1/dir1/file3.jtv |
| EF | /www/mstore1/dir1/file3.jta |
| GH | /www/mstore2/dir5/file4.jtv |
| IJ | /www/mstore2/dir3/file4.jtv |
| KL | /www/mstore1/dir2/file1.jtv |
| MN | /www/mstore3/dir3/file1.jta |
| OP | /www/mstore1/dir1/file7.jta |
| QR | /www/mstore3/dir1/file4.jtv |

NAMING SCHEME FOR MEDIA STORAGE

CROSS-REFERENCE TO RELATED PATENT APPLICATIONS

The present application claims priority under 35 U.S.C. §119(e) to U.S. Provisional Patent Application Ser. No. 61/299,498, which was filed on Jan. 29, 2010.

TECHNICAL FIELD

The present disclosure relates generally to computers and computer-related technology. More specifically, the present disclosure relates to the storage and naming of media content in a network for distributing content.

BACKGROUND

Video, audio, and other media files are often made available to client systems from Internet server systems. Internet server systems use a variety of storage devices and methods to store such media files. The media files stored on such devices are often given an identifier which may be used to identify the name and location of the file. A mapping service is often used to map the identifier into the physical memory address where the file actually resides. This mapping is typically done through a lookup table.

Although a lookup table may be an effective means of mapping in some cases, it can be relatively slow for other cases. In general, the larger the lookup table, the slower the mapping process. Though methods such as sorting or hashing may be used to speed up the process, there is still a delay during the mapping process. This delay becomes more problematic as media applications become more ubiquitous and as requirements for low latency and instant video start/seek increase.

BRIEF DESCRIPTION OF THE DRAWINGS

Throughout the drawings, identical reference numbers designate similar, but not necessarily identical, elements.

DETAILED DESCRIPTION

Video, audio, and other media files are often provided to client systems via access to file storage systems accessible through Internet server systems. Internet server systems use a variety of data storage devices and methods to store such media files. According to one exemplary system and method, media files are often given an identifier which is sometimes used to identify the name and location of the file. A mapping service is often used to translate the identifier into the physical memory address where the file actually resides. This mapping is typically done through a lookup table. As used herein, the term "lookup table" shall be interpreted to refer to a data structure, usually an array or associative array, often used to replace a runtime computation with a simpler array indexing operation wherein the array is sequentially searched for a desired file.

Although a lookup table may be an effective means of mapping in some cases, it can be relatively slow for other cases. In general, the larger the lookup table, the slower the mapping process. Though methods such as sorting or hashing may be used to speed up the process, there is still a delay during the mapping process. This delay becomes more problematic as media applications become more ubiquitous and as volume capabilities and demands increase.

While the present efficient mapping processes can be used in conjunction with any number of file identification and/or retrieval systems, efficient mapping processes are particularly useful in conjunction with the storage and on-demand delivery of media files in a system with multi-tier media store architecture. According to one example, the present content naming scheme is configured to be used with a media streaming system configured to grow to include a massive number of content files spread across a large number of nodes that are distributed over multiple point-of-presence (POP) access points across the globe. The present exemplary naming scheme is configured to allow components to quickly access individual content files as the system scales up to a very large size (peta bytes or larger).

Accordingly, the present exemplary system and method relates to a naming scheme for identifiers used by media content stored on a networked server and storage system. According to one example, the networked server system is an internet server system. The identifier may be assigned to a file when the storage system first obtains the new file. According to one illustrative example, the string of characters making up the identifier may be divided into a plurality of subsections separated by a separator character. The subsections may be placed in a specific order so that a particular subsection represents a subfolder within a folder represented by a preceding subsection. Instead of using a lookup table in the mapping process, a computation may be performed on the identifier assigned to the file to determine the location of a file. A system using a naming scheme embodying principles described herein will be able to perform the mapping relatively fast compared to traditional name mapping methods.

According to the exemplary system and method described herein, the method for naming media content files is capable of identifying all content on a networked storage system; allows system components in the fast streaming path to quickly locate content in a networked media store without having to perform computationally expensive data structure or directory lookups; binds content to customers; indicates where in the network the identified content is guaranteed to be found; supports content transcoded into multiple streaming formats, bit rates; and supports adaptive streaming.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Throughout this specification and in the appended claims, the term "media content file" refers to any media file or asset thereof.

The "path of a media content file", or "file path" refers to the actual name and directory location used by an electronic storage system storing the media content file. The term "media content file name" will refer to the name only of a media content file and not the directories in which it is located.

Throughout this specification and in the appended claims, the term "content identifier" or "content ID" refers to a unique identifier assigned to a media content file. In particular, the term "content identifier" or "content ID" as used herein refers to a string of characters, not in the form of a file path, that identifies a specific media content file.

Throughout this specification and in the appended claims, the term "map," or "mapping" will refer to the conversion of a content ID to a media content file name. Further, a "mapping service" will refer to a mechanism providing the mapping.

Throughout this specification and in the appended claims, the term "subsection" will refer to a division of a content ID. The "subsection name" will refer to the string of characters identifying a subsection.

Throughout this specification, a "directory" will refer to a virtual container within an electronic storage system, in which media content files or subdirectories may be contained. A "directory name" will refer to the actual string of characters identifying a directory.

Figure 1:
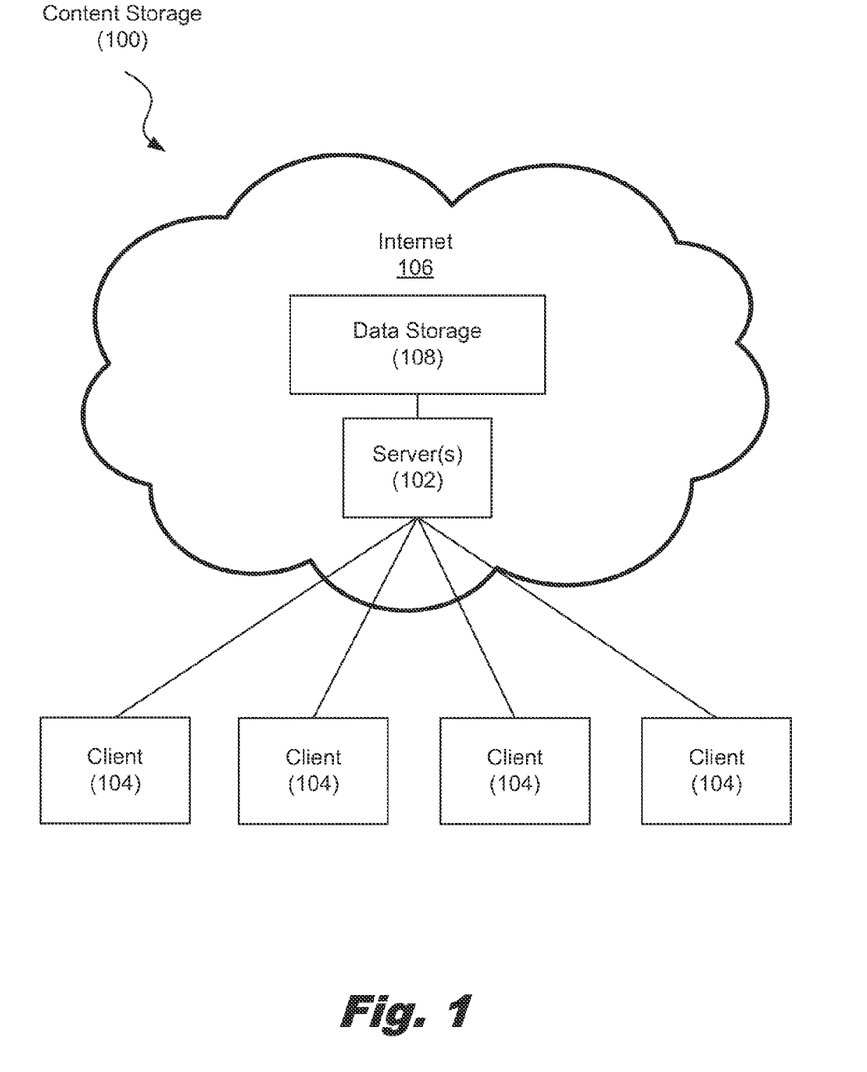
FIG. 1 is a diagram illustrating how content may be stored and accessed on the Internet, according to one example of principles described herein.

Referring now to the figures, FIG. 1 is a diagram illustrating how media content files may be stored and accessed over the Internet. While the present exemplary system and method will be described in the context of an Internet based system, the present exemplary system and method may equally be applied to any number of networked systems. As mentioned above, media content files may be made available by internet servers (102) to client systems (104). When a client system (104) desires to access media content files on the internet (106), a request for a media content file is made using a content identifier (ID) for the desired media content file. The server (102) often provides a mapping service to determine the actual name and location of the desired media content file located in data storage (108).

Figure 2:
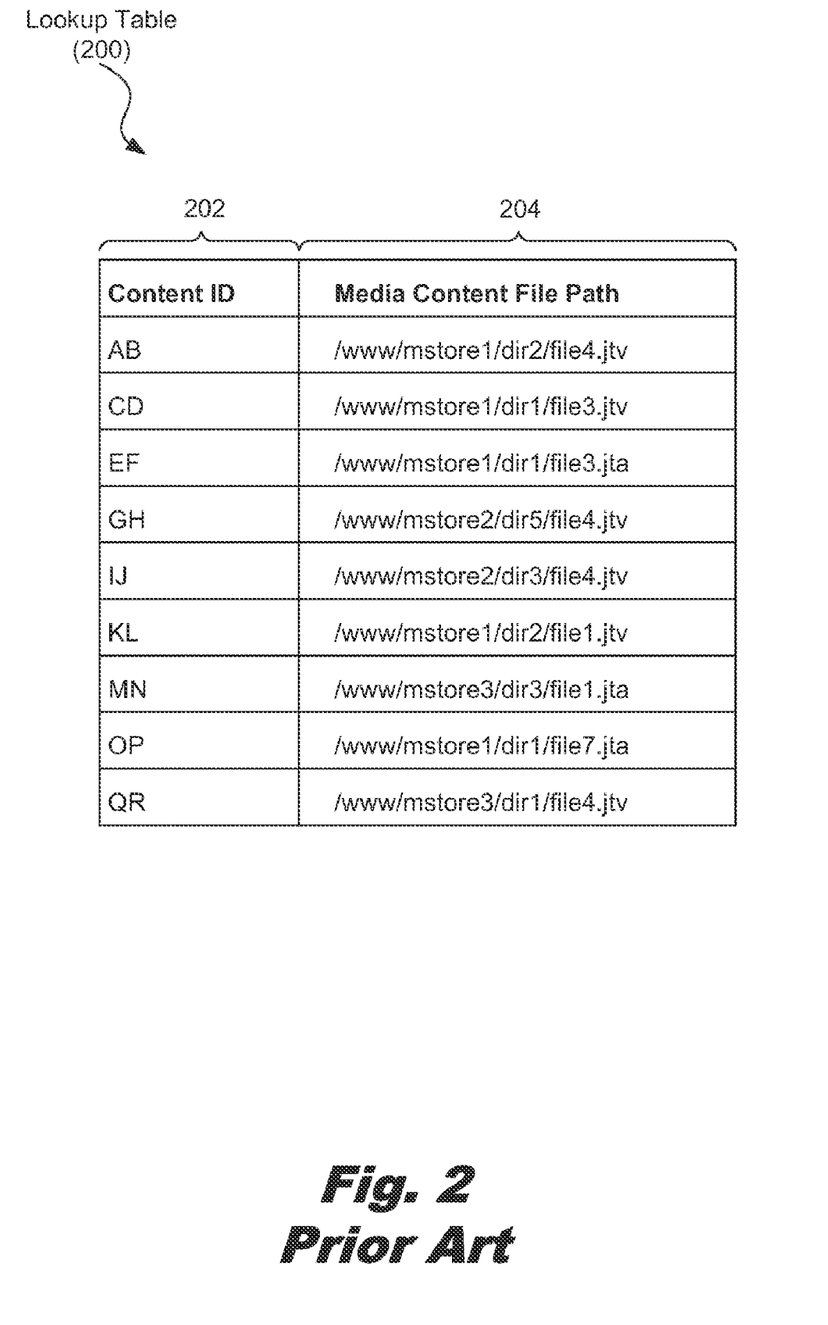
FIG. 2 is a diagram showing an illustrative lookup table used by traditional naming schemes, according to one example of principles described herein.

The mapping service is traditionally performed with a lookup table. FIG. 2 is a diagram showing an illustrative lookup table (206) used by traditional naming schemes (200). A lookup table will typically contain a content ID column (202) and a media content file name column (204).

According to traditional systems and methods, the content ID (202) may be any arbitrarily assigned value, usually made of a string of characters. These characters may include alphanumeric characters as well as other symbols. During mapping, the content ID will be searched for from the values in the content ID column (202). Sorting and hashing methods may be used to increase the efficiency of this process. After a match is found, the mapping process may then return a media content file name associated with the found content ID.

The file path may be represented in a variety of ways. A common way for an electronic storage system to display a file path is to display the root directory name first followed by a forward slash '/', if the media content file is contained within a subdirectory within the root directory, the subdirectory name will be displayed next followed by another forward slash. If the media content file is stored within an additional subdirectory within the previously mentioned subdirectory, the additional subdirectory is likewise displayed next followed by another forward slash. The actual media content file name is displayed after the forward slash following the immediate subdirectory name of the subdirectory containing the media content file. For example, the file path "/www/mstore2/dir5/file7.jtv" indicates the root directory of www, a common root directory name for internet media storage. Within the root directory is a subdirectory with a subdirectory name of "mstore2". Within the subdirectory named "mstore2" is a subdirectory with a subdirectory name of "dir5". Within the subdirectory named "dir5" is a media content file with the media content file name of "file7". The type of media content file is denoted by the extension ".jtv". As will be appreciated by one skilled in the relevant art, a file extension may denote the type of file it is associated with.

Figure 3A:
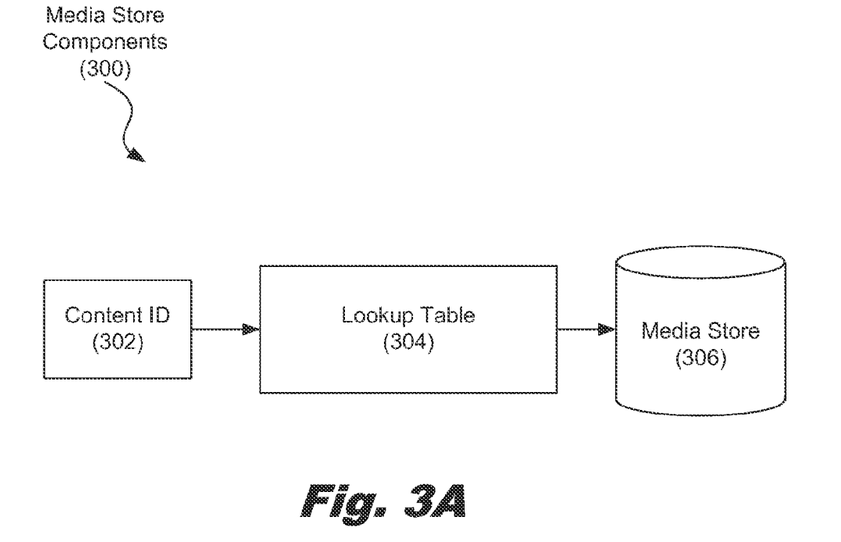
FIG. 3A is a diagram showing an illustrative process for a traditional content ID lookup, according to one example of principles described herein.

As mentioned above, a lookup table is used when a client system requests a media content file from data storage by submitting the content ID. FIG. 3A is a diagram showing an illustrative process for a traditional content ID lookup. When the content ID (302) is submitted by the client system, the mapping service searches the lookup table (302) to find the submitted content ID (302). Upon finding the submitted content ID, the mapping service returns the file path of the media content file, allowing the server system to locate the requested media content file in the media store (306). The server system may then provide the client system with access to the requested media content file.

While mapping using a lookup table will eventually identify the desired content ID, the process is relatively resource intensive and, depending on the size of the lookup table, may not be as efficient as is desired for media delivery applications. Also, a single lookup table will not scale for massively distributed servers and storage nodes except if the table has been designed to be distributed across server nodes. Specifically, the table lookup process can be unacceptably inefficient when operating with massively distributed media stores and fast content delivery requirements.

Figure 3B:
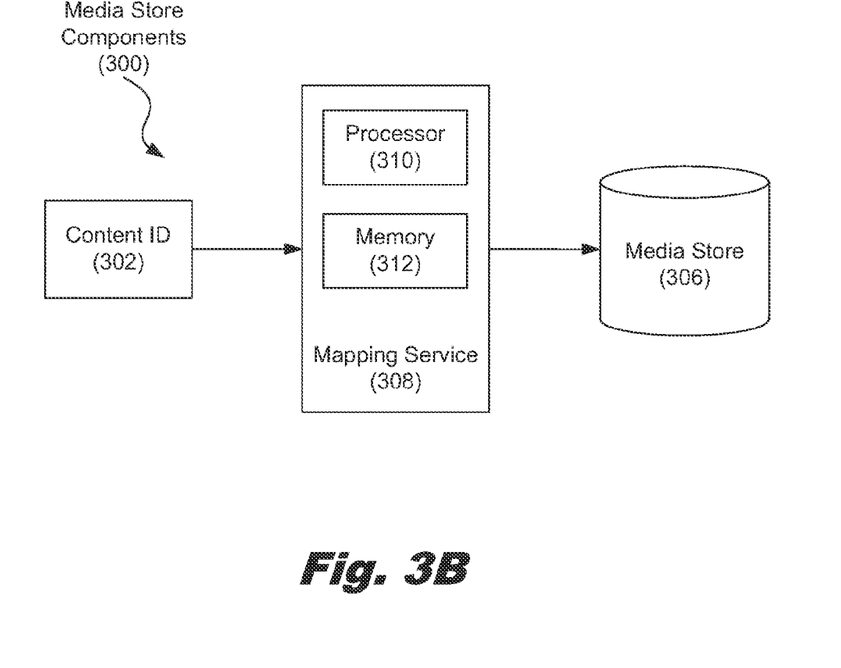
FIG. 3B is a diagram showing an illustrative process for performing a computation on a content ID, according to one example of principles described herein.

The present exemplary system and method provide a way to increase the efficiency of the mapping process by using a naming scheme for the file paths and content ID that allows a consistent computation to be performed directly on the content ID to determine the file path of a media content file. This scheme even precludes the need for distributed lookup tables to address the requirement for mapping of content distributed across a large number of storage nodes. FIG. 3B is a diagram showing an illustrative process for performing a computation on a content ID, according to one example.

According to one illustrative example, when a client system requests access to media content on the media store (306), the mapping service (308) performs a computation directly on the content ID (302) to return the file path of the requested media content file. Consequently, the file path of the requested media content file is readily provided without the inefficiencies associated with a lookup table process—whether a single or distributed table. This mapping scheme has a constant O(1) computation time irrespective of the number of content files and the corresponding distribution and location in the storage scheme. As understood by those having skill in the art, the mapping service (308) may include at least one processor (310) communicatively coupled to a memory (312) storing executable code that causes said processor (310) to perform the steps described herein for ascertaining the file path of the requested media content from the content ID (302).

Figure 4A:
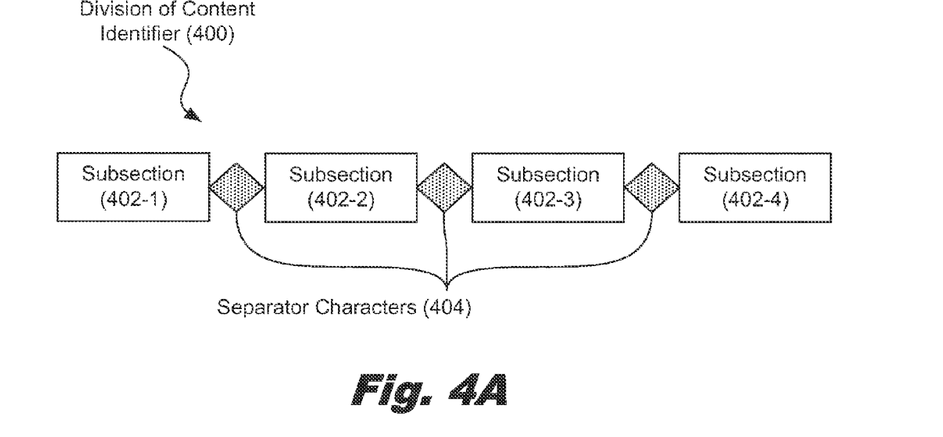
FIG. 4A is a diagram showing an illustrative division of a content ID into subsections and separator characters, according to one example of principles described herein.

FIG. 4A is a diagram showing an illustrative division of a content ID (400) into subsections and separator characters, according to one example. As illustrated, a content ID may be made up of a string of characters. To facilitate the computation shown in FIG. 3B, the content ID may be divided up into a plurality of subsections (402-1, 402-2, 402-3, 402-4) with a separator character (404) in between each subsection. Each subsection may include a number of characters.

In one example, the first subsection (402-1) may be named to denote a specific volume on which the media content file identified by the content ID is stored. Further subsections (402-2, 402-3) may be named to denote specific subfolders containing the media content file identified by the content ID. The last subsection (402-4) may be associated with the actual file name of the media file.

A separator character (404) is used to separate the various subsections and may be any character which is denoted by the system as such. The characters making up the subsections may not include the separator character. An example of a separator character (404) may be an underscore '_', a dash '-', or even any random number or letter.

Figure 4B:
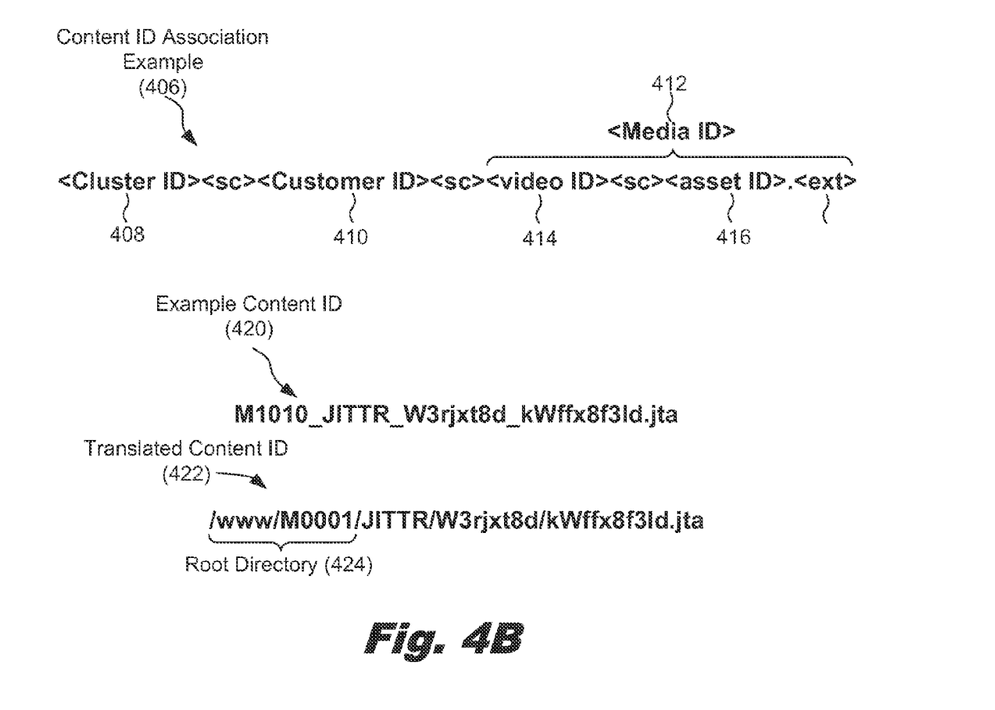
FIG. 4B is a diagram showing an example of a translated content ID, according to one example of principles described herein.

In one example, the subsections could be associated with various properties of the media content file. FIG. 4B is a diagram showing an example of a content ID association (406). According to one illustrative example, the subsections associations could include a cluster ID (408), a customer ID (410), and a media ID (412) including a video ID (414), an asset ID (416), and a file extension (418). FIG. 4B further includes an example content ID (420), and an example translated content ID (422).

The subsection names may denote specific properties of the media content file. One subsection name may be a cluster ID (408) which may identify a cluster within a storage network. A cluster is a number of storage volumes. The cluster may be controlled by a single hardware controller. Thus, the cluster will appear to a system as one volume. Data may be mirrored, striped, or a combination of both across the volumes within a cluster. Mirroring refers to duplicating data across multiple volumes. Striping refers to spreading data across multiple volumes.

In certain examples, data may also be selectively replicated across multiple clusters. In such examples, the same content ID may be used to refer to a media content file at each location. Thus, if a server cluster receives a request for a media content file correlated with a content ID, the recipient server cluster may first check to see if the file path indicated by the content ID is present in its own storage. If the file path is not found on the recipient cluster, the cluster ID (408) from the content ID may be used to determine the home storage volume of the media content file. Once the home storage volume for the media content file has been located, the recipient cluster may either redirect the client request to the home cluster for the media content file or download the media content file from its home cluster and then serve the requested media content file to the client.

One subsection name may be a customer ID (410) which may identify a customer storing media files on the storage. Various customers may produce media content and desire that their content be made available to client systems.

The media ID subsections (412) may include a plurality of characters which may identify a customer's content. The media ID (412) may include a video ID (414), an asset ID (414), and a file extension. One subsection name may be a video ID (414) which may correspond to a folder name which may identify a particular video belonging to a customer. Within the folder having the same name as the video ID (414), files which are named in accordance with an asset ID (416) are stored. Each video may have several asset files. The asset files may include among other things, a video file, an audio file, a subtitle file etc. As will be appreciated by those skilled in the relevant art, electronic files typically have a file extension (418) identifying file type.

FIG. 4B also shows an example content ID (420). In this example, 'M1010' Identifies the cluster associated with a media content file, 'JITTR' identifies a customer associated with the media content file, 'W3rjxt8d' identifies a video belonging to the customer or owner of the media content file, 'kWffx8f31d' identifies an asset file within the folder with the same name as the video ID (414) folder, and the extension '.jta' identifies the file type. An underscore '_' is used as a separator character. In one example and in the example shown, the subsection names may be obfuscated to provide security for the media file. [the system is actually replacing characters at specific byte offsets to perform the mapping from content ID to filename. Mapping process (block 510) does not actually scan the contentID for a separator. Separator can be any random character so as to obfuscate the contentID.

FIG. 4B also illustrates a path and name of a file having been mapped by a mapping service. According to one illustrative example, the mapping service may replace the cluster ID (408) with the root directory of the identified cluster. All separator characters may be replaced with the forward slash '/' character. The translated content ID (422) will be the path and file name of the desired file.

Figure 5:
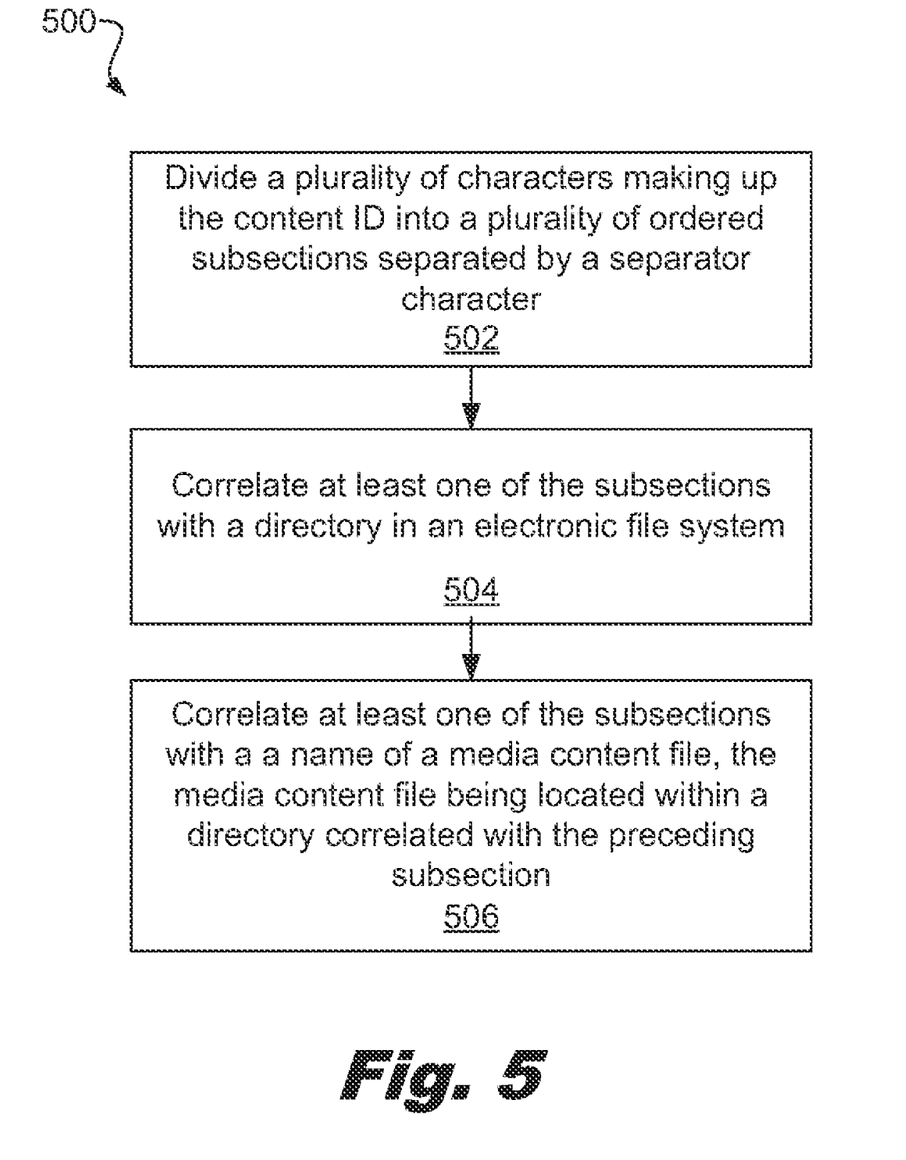
FIG. 5 is a flowchart showing an illustrative method allowing for fast mapping between a content identifier (ID) for a media content file and the file path of said media content file, according to one example of principles described herein.

FIG. 5 is a flowchart showing an illustrative method allowing for fast mapping between a content identifier (ID) for a media content file and the file path of said media content file. According to one illustrative example, a content ID may be divided (block 502) into a plurality of ordered subsections, each subsection being separated by a separator character. At least one subsection may be correlated (block 504) with a directory in an electronic file system. At least one of the subsections may be correlated (block 506) with a name for a media content file located within a directory being named to correlate with a preceding subsection name.

Figure 6:
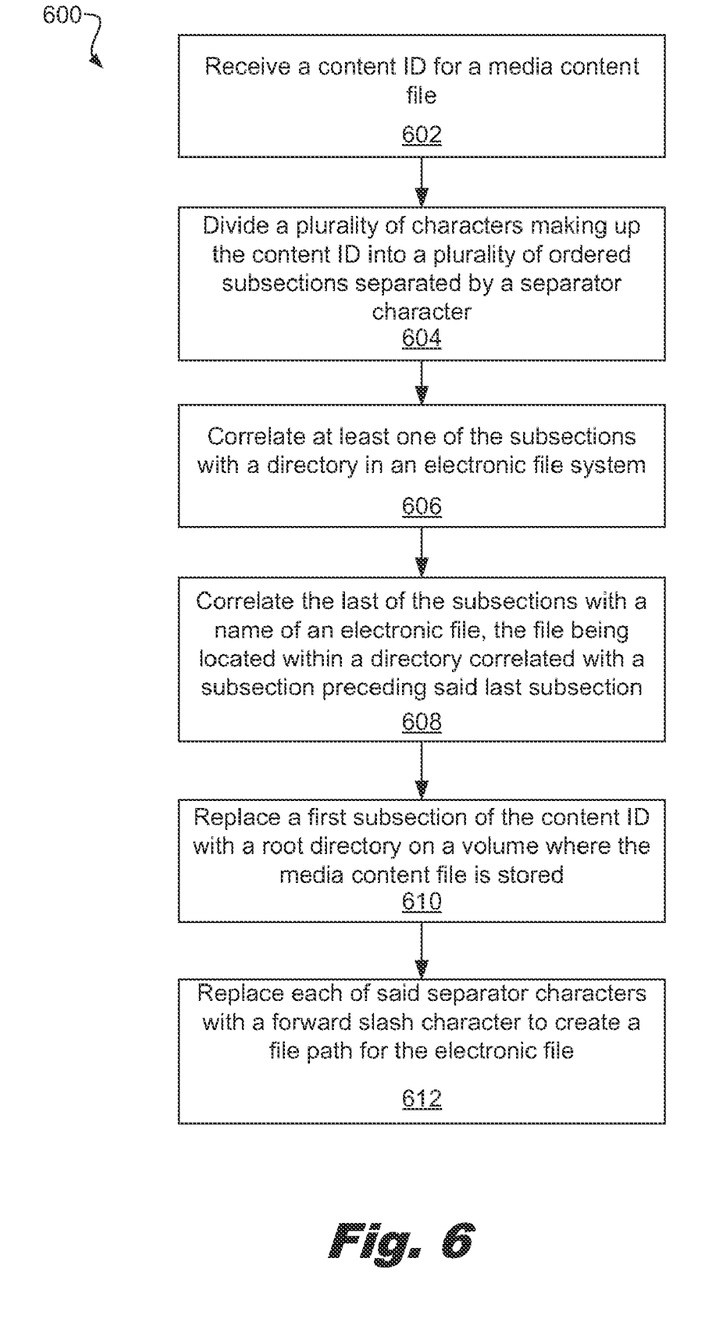
FIG. 6 is a flowchart showing an illustrative method allowing for fast mapping between a content ID for a media content file and the file path of the media content file, according to one example of principles described herein.

FIG. 6 is a flowchart showing an illustrative method for determining a file path for a media file corresponding to a content ID received from a client system. Upon receipt (block 602) of a content ID from a client system, the content ID may be divided (block 604) into a plurality of ordered subsections, each subsection being separated by a separator character. At least one subsection may be correlated (block 606) with a directory in an electronic file system. A last of the subsections may be correlated (block 608) with a name for a media content file located within a directory being named to correlate with a preceding subsection name. The first subsection of the content ID may be replaced (block 610) with the root directory name of the volume storing the media content file. The separator characters may be replaced (block 612) with the forward slash character '/'. The result of the above mentioned replacements may be a file path for the media content file. This file path may be used to locate the media content file in one or more clusters as described above. In certain examples, the file path will refer to a file location in a server cluster that receives the content ID from the client system.

According to one example, the present exemplary system and method is particularly suited for video streaming. As used herein, the term "video streaming" is meant to be understood as a system whereby an Internet user requests a video (which is done using a standard HTTP "GET" request) and chunks or streamlets of video are transferred over the Internet from one or more origin Web servers to the client's Web browser or client application where they are reassembled in the correct order. As video streaming is very data intensive and time sensitive, the present exemplary system and method are well suited to providing data from one or more data sources to support adaptive streaming.

In conclusion, by assigning a content ID to a file based on its file path within a data storage, a simple and comparably rapid computation may be performed to determine the file path from the content ID. The content ID may include a string of characters divided into a plurality of subsections. The subsection names may correlate to directories of an file-based electronic storage system in which the media content file identified by the content ID is stored. Consequently, the ability to efficiently and quickly provide desired media content from a data store of potentially unlimited size is realized. Furthermore, the present exemplary system is capable of identifying all content on a networked storage; allows system components in a fast streaming path to quickly locate content in a networked media store without having to perform computationally expensive directory lookups; binds content to customers; indicates where in the network the identified content is guaranteed to be found; supports content transcoded into multiple streaming formats, bit rates; and supports adaptive streaming.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method allowing for fast mapping between a content identifier (ID) for a media content file and a file path of said media content file in an electronic data storage system, the method comprising:
dividing a plurality of characters making up said content ID into a plurality of ordered subsections separated by a separator character;
correlating at least one of said subsections with a directory in an electronic file system for said electronic data storage system;
correlating the last of said subsections with a name of said media content file, said media content file being located within a directory correlated with a preceding subsection;
receiving a content ID from a client system;
replacing at least a first subsection of said content ID with a root directory on a volume where said media content file is located; and
replacing each of said separator characters with a forward slash character to create said file path for said media content file;
in which said media content file is one of a video file, an audio file, or a data file.

2. The method of claim 1, in which at least one subsection name correlates to a name of a cluster on a data storage network.

3. The method of claim 1, in which at least one subsection name correlates to a name of a storage volume.

4. The method of claim 3, in which a name of a said directory in said electronic file system identifies a group of media content files.

5. The method of claim 1, in which a name of a said directory in said electronic file system identifies an owner of said media content file.

6. A content identifier mapping system comprising:
at least one processor configured to access and execute computer readable instructions stored on a computer readable storage medium;
said computer readable instructions being configured to cause said at least one processor to, upon execution of said computer readable instructions:
divide a plurality of characters making up a content Identifier (ID) into a plurality of ordered subsections separated by a separator character;
correlate at least one of said subsections with a directory in an electronic file system;
correlate a last of said subsections with a name of a media content file, said media content file being located within a directory correlated with a preceding subsection; and
receive a content ID from a client system;
replace at least a first subsection of said content ID with a root directory on a volume where said media content file is located; and
replace each of said separator characters with a forward slash character to create said file path for said media content file;
in which said media content file is one of a video file, an audio file, or a data file.

7. The system of claim 6, in which at least one subsection name correlates to a name of a cluster on a data storage network.

8. The system of claim 6, in which at least one subsection name correlates to a name of a storage volume.

9. The system of claim 6, in which a name of a said directory in said electronic file system identifies an owner of said media content file.

10. The system of claim 6, in which a name of a said directory in said electronic file system identifies a group of media content files.

11. A method of providing a media content file to a client system, comprising:
receiving a content identifier (ID) from said client system;
dividing a plurality of characters making up said content ID into a plurality of ordered subsections separated by a separator character;
replacing a first subsection of said content ID with a root directory on a storage volume where said media content file is located;
replacing each of said separator characters with a forward slash character to create a file path for said media content file;
locating said media content file using said file path; and
providing said media content file to said client system;
in which said media content file is one of a video file, an audio file, or a data file.

12. The method of claim 11, in which at least one subsection name correlates to a name of a cluster on a data storage network.

13. The method of claim 11, in which at least one subsection name correlates to a name of a storage volume.

14. The method of claim 11, in which a name of a said directory in said electronic file system identifies an owner of said media content file.

15. The method of claim 14, in which a name of a said directory in said electronic file system identifies a group of media content files.

* * * * *